United States Patent
Papandreou et al.

(10) Patent No.: US 10,936,205 B2
(45) Date of Patent: Mar. 2, 2021

(54) TECHNIQUES FOR RETENTION AND READ-DISTURB AWARE HEALTH BINNING

(71) Applicant: INTERNATIONAL BUSINESS MACHINES CORPORATION, Armonk, NY (US)

(72) Inventors: Nikolaos Papandreou, Thalwil (CH); Roman Pletka, Uster (CH); Sasa Tomic, Kilchberg (CH)

(73) Assignee: International Business Machines Corporation, Armonk, NY (US)

(*) Notice: Subject to any disclaimer, the term of this patent is extended or adjusted under 35 U.S.C. 154(b) by 122 days.

(21) Appl. No.: 15/725,699

(22) Filed: Oct. 5, 2017

(65) Prior Publication Data

US 2019/0107959 A1  Apr. 11, 2019

(51) Int. Cl.
*G06F 3/06* (2006.01)
*G06F 11/07* (2006.01)
*G06F 12/02* (2006.01)

(52) U.S. Cl.
CPC .......... *G06F 3/0619* (2013.01); *G06F 11/076* (2013.01); *G06F 11/0727* (2013.01); *G06F 12/0246* (2013.01); *G06F 12/0253* (2013.01); *G06F 2212/1032* (2013.01); *G06F 2212/7211* (2013.01)

(58) Field of Classification Search
CPC ...... G06F 3/0619; G06F 3/061; G06F 3/0653; G06F 3/0614; G06F 11/076; G06F 12/0246; G06F 2212/1032; G06F 2212/7211

See application file for complete search history.

(56) References Cited

U.S. PATENT DOCUMENTS

| 7,616,499 B2 | 11/2009 | Wan et al. |
| 8,422,303 B2 | 4/2013 | Franca-Neto et al. |
| 8,579,986 B1 | 11/2013 | Freeman et al. |

(Continued)

FOREIGN PATENT DOCUMENTS

| CN | 101419843 | 4/2009 |
| CN | 102880554 | 12/2013 |

(Continued)

OTHER PUBLICATIONS

Pletka, Roman A. et al; "Health-Binning: Maximizing the Performance and the Endurance of Consumer-Level NAND Flash." Proceedings of the 9th ACM International on Systems and Storage Conference. ACM, 2016.

(Continued)

*Primary Examiner* — David Yi
*Assistant Examiner* — Nicholas A. Paperno
(74) *Attorney, Agent, or Firm* — Stosch Sabo; Brian F. Russell

(57) ABSTRACT

A technique for performing health binning in a storage system includes in response to a block having a retention time below a first threshold and a read count below a second threshold, utilizing a first error metric for health binning. The first error metric is a current error metric for the block. In response to the block having a retention time above a third threshold that is greater than or equal to the first threshold or a read count above a fourth threshold that is greater than or equal to the second threshold, utilizing a second error metric that is not the same as the current block error metric for health binning.

20 Claims, 11 Drawing Sheets

(56) References Cited

U.S. PATENT DOCUMENTS

| | | |
|---|---|---|
| 8,990,485 B2 | 3/2015 | Haukness et al. |
| 9,069,688 B2 | 6/2015 | Chung et al. |
| 9,176,859 B2 | 11/2015 | Walston et al. |
| 9,361,167 B2 | 6/2016 | Kealy et al. |
| 9,530,522 B1 | 12/2016 | Christensen et al. |
| 9,563,504 B2 | 2/2017 | Liang et al. |
| 9,576,671 B2 | 2/2017 | Karakulak et al. |
| 9,772,901 B2 | 9/2017 | Hoekstra et al. |
| 9,805,809 B1 | 10/2017 | Zhou et al. |
| 9,857,986 B2 | 1/2018 | Fisher et al. |
| 10,082,962 B2 | 9/2018 | Fisher et al. |
| 10,121,551 B1 | 11/2018 | Miller et al. |
| 10,140,040 B1 | 11/2018 | Koudele et al. |
| 10,170,162 B2 | 1/2019 | Al-Shamma et al. |
| 10,170,195 B1 | 1/2019 | Ioannou et al. |
| 10,236,067 B2 | 3/2019 | Fisher et al. |
| 10,453,537 B1 | 10/2019 | Reuter et al. |
| 10,552,063 B2 | 2/2020 | Pletka et al. |
| 2007/0263444 A1* | 11/2007 | Gorobets ............... G11C 8/10 365/185.09 |
| 2008/0133288 A1 | 6/2008 | Thibaux et al. |
| 2009/0319859 A1 | 12/2009 | Alrod et al. |
| 2010/0023800 A1 | 1/2010 | Harari et al. |
| 2011/0007562 A1 | 1/2011 | Yip |
| 2012/0226959 A1 | 9/2012 | Xie et al. |
| 2013/0111113 A1 | 5/2013 | Harari et al. |
| 2014/0056067 A1 | 2/2014 | Zhang et al. |
| 2014/0164880 A1 | 6/2014 | Chen et al. |
| 2014/0229799 A1* | 8/2014 | Hubris ................. H04L 1/0009 714/773 |
| 2015/0332788 A1 | 11/2015 | Bellorado et al. |
| 2016/0041891 A1 | 2/2016 | Malshe et al. |
| 2016/0103630 A1* | 4/2016 | Shen ..................... G06F 3/0653 714/37 |
| 2016/0110124 A1 | 4/2016 | Camp et al. |
| 2016/0110248 A1 | 4/2016 | Camp et al. |
| 2016/0110249 A1* | 4/2016 | Orme ................. G06F 12/0238 714/6.24 |
| 2016/0170672 A1 | 6/2016 | Li et al. |
| 2016/0179412 A1 | 6/2016 | Camp et al. |
| 2017/0003880 A1 | 1/2017 | Fisher et al. |
| 2017/0091006 A1 | 3/2017 | Camp et al. |
| 2017/0161142 A1 | 6/2017 | Reed et al. |
| 2017/0185463 A1 | 6/2017 | Kim et al. |
| 2017/0220416 A1 | 8/2017 | Yao |
| 2017/0236588 A1 | 8/2017 | Kim et al. |
| 2017/0263311 A1 | 9/2017 | Cometti |
| 2017/0358365 A1 | 12/2017 | Ray et al. |
| 2018/0033490 A1 | 2/2018 | Marelli et al. |
| 2018/0190362 A1 | 7/2018 | Barndt et al. |
| 2018/0341413 A1 | 11/2018 | Lai et al. |
| 2018/0374549 A1 | 12/2018 | Padilla et al. |
| 2019/0066802 A1 | 2/2019 | Malshe et al. |
| 2019/0155749 A1 | 5/2019 | Hahn et al. |
| 2019/0172542 A1 | 6/2019 | Miladinovic |
| 2019/0180829 A1 | 6/2019 | Chen et al. |

FOREIGN PATENT DOCUMENTS

| | | |
|---|---|---|
| CN | 105718206 | 6/2016 |
| EP | 2549482 A1 | 1/2013 |
| EP | 2587362 A3 | 8/2013 |
| WO | 2014088682 A1 | 6/2014 |
| WO | 2018022807 A1 | 2/2018 |

OTHER PUBLICATIONS

Yaakobi et al., "Error Characterization and Coding Schemes for Flash Memory", describes bit-level BER, page-level BER measurements and a proposed error correcting scheme (see section III B-C and section IV). 2010 https://cseweb.ucsd.edu/~swanson/papers/ACTEMT2010ECC.pdf.

A. Prodromakis et al., "MLC NAND Flash memory: Aging effect and chip/channel emulation", 2015, describe measuring BER (see document). https://pdfs.semanticscholar.org/8407/bf47ed375c28a05bd2bb1a9f9c8f4d00cbe3.pdf.

Fang et al.; "Efficient Bit Error Rate Estimation for High-Speed Link by Bayesian Model Fusion", 2015 Design, Automation & Test in Europe Conference & Exhibition, pp. 1024-1029(see as copied attached).

Weis et al.; "Retention Time Measurements and Modeling of Bit Error Rates of WIDE I/O DRAM in MPSoCs", 2015 Design, Automation & Test in Europe Conference & Exhibition, pp. 495-500 (see as copied attached).

Jimenez et al.; "Phoenix: Reviving MLC Blocks as SLC to Extend NAND Flash Devices Lifetime", 2013 (see as copied attached).

Fatadin, Irshaad et al.; "Calibration of Estimated BER From Vector Magnitude With Carrier Phase Recovery", Scientific Pages Photonics Opt 1(1):1-6, 2017 (see as copied attached).

Cai et al.; "Error Analysis and Retention-Aware Error Management for NAND Flash Memory", Intel Technology Journal, vol. 17, Issue 1, 2013 (see as copied attached).

Appendix P.

* cited by examiner

US 10,936,205 B2

TECHNIQUES FOR RETENTION AND READ-DISTURB AWARE HEALTH BINNING

BACKGROUND OF THE INVENTION

This disclosure relates to data processing and storage, and more specifically, to techniques for retention and read-disturb aware health binning for a non-volatile memory array.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state. Each erase pulse is generally followed by an erase verify operation that reads the erase block to determine whether the erase operation was successful, for example, by verifying that less than a threshold number of memory cells in the erase block have been unsuccessfully erased. In general, erase pulses continue to be applied to the erase block until the erase verify operation succeeds or until a predetermined number of erase pulses have been used (i.e., the erase pulse budget is exhausted).

A NAND flash memory cell can be programmed by applying a positive high program voltage to the word line of the memory cell to be programmed and by applying an intermediate pass voltage to the memory cells in the same string in which programming is to be inhibited. Application of the program voltage causes tunneling of electrons onto the floating gate to change its state from an initial erased state to a programmed state having a net negative charge. Following programming, the programmed page is typically read in a read verify operation to ensure that the program operation was successful, for example, by verifying that less than a threshold number of memory cells in the programmed page contain bit errors. In general, program and read verify operations are applied to the page until the read verify operation succeeds or until a predetermined number of programming pulses have been used (i.e., the program pulse budget is exhausted).

BRIEF SUMMARY

A technique for performing health binning in a storage system includes in response to a block having a retention time below a first threshold and a read count below a second threshold, utilizing a first error metric for health binning. The first error metric is a current error metric for the block. In response to the block having a retention time above a third threshold that is greater than or equal to the first threshold or a read count above a fourth threshold that is greater than or equal to the second threshold, utilizing a second error metric that is not the same as the current block error metric for health binning.

The disclosed techniques may be implemented as a method, a data storage system, and/or a program product (including program code stored in a storage device).

DETAILED DESCRIPTION

Figure 1A:
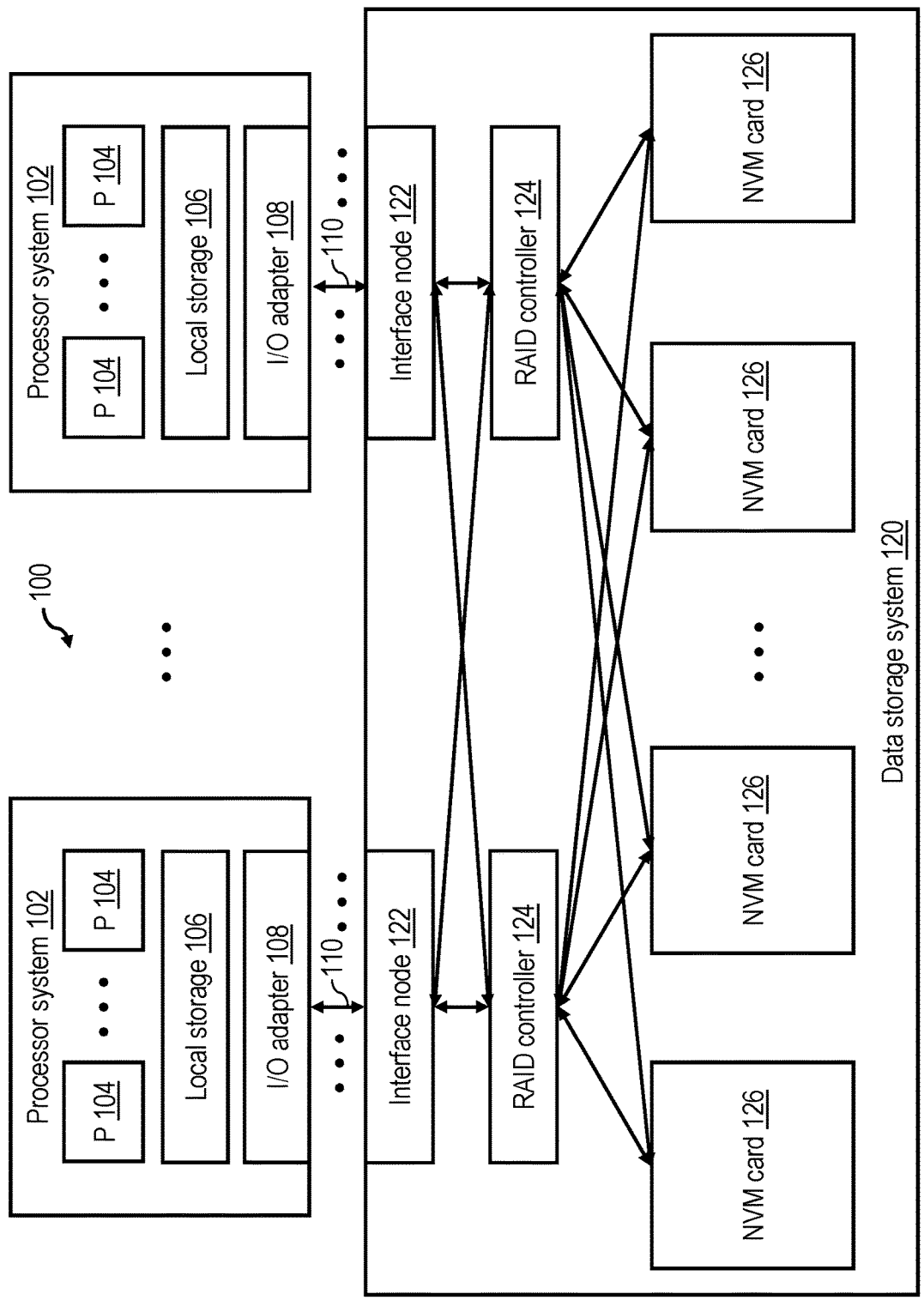
FIG. 1A is a high level block diagram of a data processing environment in accordance with one embodiment.

Health binning has been introduced as an efficient way to balance wear of NAND Flash blocks to increase the overall endurance of Flash-based storage devices (see, for example, U.S. Patent Application Publication No. 2015/0177995 and R. Pletka and S. Tomic, Health-Binning: Maximizing the Performance and the Endurance of Consumer-Level NAND Flash, SYSTOR 2016). In health binning a wear or health characteristic of each block is determined by a Background Health Checker (BGHC), e.g., see R. Pletka and S. Tomic, Health-Binning: Maximizing the Performance and the Endurance of Consumer-Level NAND Flash, SYSTOR 2016 and U.S. Patent Application Publication No. 2016/0110248. The wear or health characteristics of each block are then used in the data-placement process to map hotter data (i.e., more frequently updated data) to 'healthier' blocks and colder data (i.e., less frequently updated data) to 'less healthy' blocks.

Block health can be viewed as an estimate of the remaining life of a block prior to the block being retired from use. Thus, a 'healthier' block is defined to be a block having a relatively longer estimated remaining life (in terms of program/erase cycles), and a 'less healthy' block is defined to be a block having a relatively shorter remaining life. U.S. Patent Application Publication No. 2015/0177995 and R. Pletka and S. Tomic, Health-Binning: Maximizing the Performance and the Endurance of Consumer-Level NAND Flash, SYSTOR 2016 disclose using error metrics of a block as a metric of block health or wear status. For example, an error metric may include a per-page and/or a per-block bit error count, and/or an average raw bit error rate (RBER) of a block, and/or a maximum RBER of a worst codeword in a block (maxRBER), and/or a rate of change of a bit error rate (i.e., the derivative of the bit error rate), and/or an average per-page bit error count, a bit error rate, and/or a bit error rate derivative for each block. The error metric may also be measured as being the logarithm of any of these values.

In general, error counts may be extracted from an error correcting code (ECC) decoder of a flash controller when a BGHC performs periodic scrub read or block calibration operations. Based on the health distribution of all blocks, health grades are assigned to blocks using a set of adaptive thresholds that classify blocks into one of the health grades according to a fixed or variable percentage of the health distribution. Health grades are then used to map blocks to write streams with suitable heat levels upon data placement. The limited endurance of NAND flash is generally attributed to permanent damage in the insulating oxide due to charge trapping. The amount of trapped charge typically increases with increasing program/erase cycle (PEC) count (see, for example, N. Mielke, T. Marquart, N. Wu, J. Kessenich, H. P. Belgal, E. Schares, F. Trivedi, E. Goodness, and L. R. Nevill, Bit error rate in NAND Flash memories, Proc. 46th Annual International Reliability Physics Symposium, IRPS '08, pages 9-19, April/May 2008).

The RBER of a block may be significantly reduced by using optimal threshold voltages (see, for example, N. Papandreou, T. Parnell, H. Pozidis, T. Mittelholzer, E. S. Eleftheriou, C. J. Camp, T. J. Griffin, G. A. Tressler, and A. A. Walls, Using adaptive read voltage thresholds to enhance the reliability of MLC NAND flash memory systems, Proc. 24th ACM Great Lakes Symp. on VLSI, GLSVLSI '14, pages 151-156, May 2014). These optimal threshold voltages are periodically determined by the BGHC using a tracking algorithm, in a process referred to as block calibration. In addition to cycling-induced charge trapping, read-disturb and retention effects can also cause an additional temporary increase in the RBER due to wider threshold voltage distributions that increase the overlap of threshold voltage levels.

Read-disturb and retention effects have been shown to be more pronounced for blocks that have higher PEC count (see, for example, N. Mielke, T. Marquart, N. Wu, J. Kessenich, H. P. Belgal, E. Schares, F. Trivedi, E. Goodness, and L. R. Nevill, Bit error rate in NAND Flash memories, Proc. 46th Annual International Reliability Physics Symposium, IRPS '08, pages 9-19, April/May 2008). U.S. Pat. No. 9,251,909 describes a block calibration process that minimizes the RBER by separating threshold voltage shift values into two parts, i.e., a base shift (that tracks permanent changes in the underlying threshold voltage distributions from program/erase cycling) and a delta shift (that adapts to temporary changes in the underlying threshold voltage distributions from retention and read disturb effects).

According to aspects of the present disclosure, techniques are implemented to distinguish between persistent error metrics (that are used to perform health binning) and transient error metrics (that are observed during background read scrubbing or block calibration). The current error metrics determined (i.e., a currently measured error metric) during read scrubbing or block calibration are only utilized when a block has low retention time (e.g., less than a certain amount of time) and low read counts (e.g., less than a certain amount of reads since the block was programmed). The definition of low retention time and low read count heavily depends on characteristics of the NAND Flash and therefore must be determined through device characterization. Hence, depending on the device, the maximum amount of time for which retention time is considered to be low may be in the order of minutes, hours, days, or weeks. Similarly, the maximum number of reads for which the read count is considered to be low may range in the order of several hundred, thousands, or ten-thousands of reads or more since the block was programmed.

When a block has seen a high retention time (e.g., greater a certain amount of time) and/or a high number of reads (e.g., greater than a certain amount of reads since the block was programmed), a previous error metric (observed when retention and read count were low) is utilized for health binning. High retention time may be defined as being an amount of time that corresponds to at least the maximum amount of retention time considered to be a low retention time or a multiple thereof. Similarly, a high number of reads can be defined as being at least the maximum number of reads for which the read count is considered to be low or a multiple thereof.

A persistent error metric may not be updated when retention time is high or read count is high, or may be updated with an estimated value instead of a current error metric (i.e., a currently measured error metric) as long as a PEC count has not significantly increased (e.g., greater than one or a few thousand PEC counts early in life). A value of a PEC count increase that is considered significant decreases with increasing wear of the block and may reach only be several tens or hundreds towards end of device life. Depending on the characteristics of the NAND Flash device, applying a previous persistent error metric for health binning may be a reasonably good approximation of the error metric. In the event the PEC count of a block increased significantly since the persistent error metric was measured, the error metric may be estimated using an error metric model. Blocks with significant PEC count increase since a last base calibration may optionally be marked for a base calibration when a block stripe is completely filled with new data or removed from further data placement due to other reasons.

With reference to the figures and with particular reference to FIG. 1A, there is illustrated a high level block diagram of an exemplary data processing environment 100 including a data storage system 120 that is configured to perform retention and read-disturb aware health binning according to the present disclosure. As shown, data processing environment 100 includes one or more hosts, such as a processor system 102 having one or more processors 104 that process instructions and data. Processor system 102 may additionally include local storage 106 (e.g., Dynamic Random Access Memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER® series available from International Business Machines Corporation), or a mainframe computer system. Processor system 102 can also be an embedded processor system using various processors such as ARM®, POWER, Intel X86, or any other processor combined with memory caches, memory controllers, local storage, I/O bus hubs, etc.

Each processor system 102 further includes an Input/Output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), Non-volatile Memory Express (NVMe), NVMe over Fabrics, etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface nodes 122 through which data storage system 120 receives and responds to IOPs via I/O channels 110. Each interface node 122 is coupled to each of multiple outer Redundant Array of Inexpensive Disks (RAID) controllers 124 in order to facilitate fault tolerance and load balancing. Each of outer RAID controllers 124 is in turn coupled (e.g., by a PCIe bus) to each of multiple NVM cards 126 including, in this example, NVM storage media. In other embodiments, other lossy storage media can be employed.

Figure 1B:
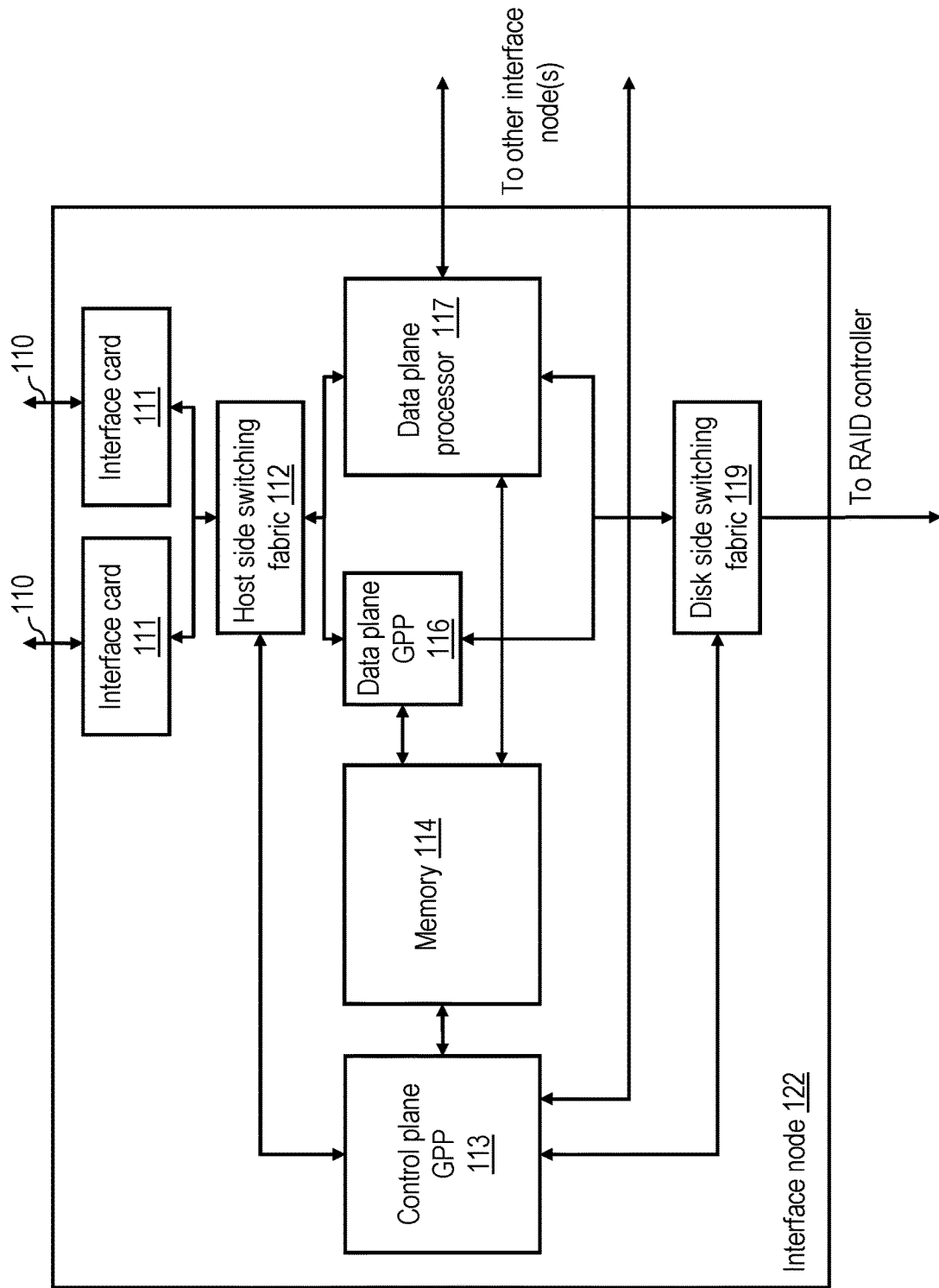
FIG. 1B is a more detailed block diagram of an exemplary interface node of a data storage system of FIG. 1A.

FIG. 1B depicts a more detailed block diagram of an interface node 122 of data storage system 120 of FIG. 1A. Interface node 122 includes one or more interface cards 111 that serve as an interface to processor systems 102 through I/O channels 110 and connect to host side switching fabric 112. The host side switching fabric 112 acts as a switch and handles all data transfers between interface cards 111 and processing units in interface node 122, namely control plane general purpose processor (GPP) 113, data plane GPP 116, and data plane processor 117. Typically, host side switching fabric 112 consist of a PCIe switch, but other switch technologies may be used as well. Data plane processor 117 is a special purpose processor that can be implemented, for example, by an Application Specific Integrated Circuit (ASIC) or a Field Programmable Gate Array (FPGA). Control plane GPP 113, data plane GPP 116, and data plane processor 117 are all connected to memory 114 which may be implemented as a shared memory between these components, separate memories, or a combination thereof.

In embodiments in which data plane processor 117 is implemented with an FPGA, control plane GPP 113 may program and configure data plane processor 117 during start-up of data storage system 120. Data plane GPP 116 and control plane GPP 113 control data plane processor 117 as well as access to NVM cards 126 either indirectly through the control of data plane processor 117 or directly through disk side switching fabric 119. Control plane GPP 113 executes system management functions as well as higher level services such as snapshots, thin provisioning, and deduplication. Data plane GPP 116 executes protocol specific functions. Control plane GPP 113, data plane GPP 116, and data plane processor 117 are connected to outer RAID controller 124 through disk side switching fabric 119 which typically consist of a PCIe switch, but other switch technologies may be used as well. FIG. 1B further illustrates control plane GPP 113 and data plane processor 117 being connected to other interface nodes 122 in data storage system 120 to handle fail-over scenarios or for performing other data synchronization functions.

Figure 1C:
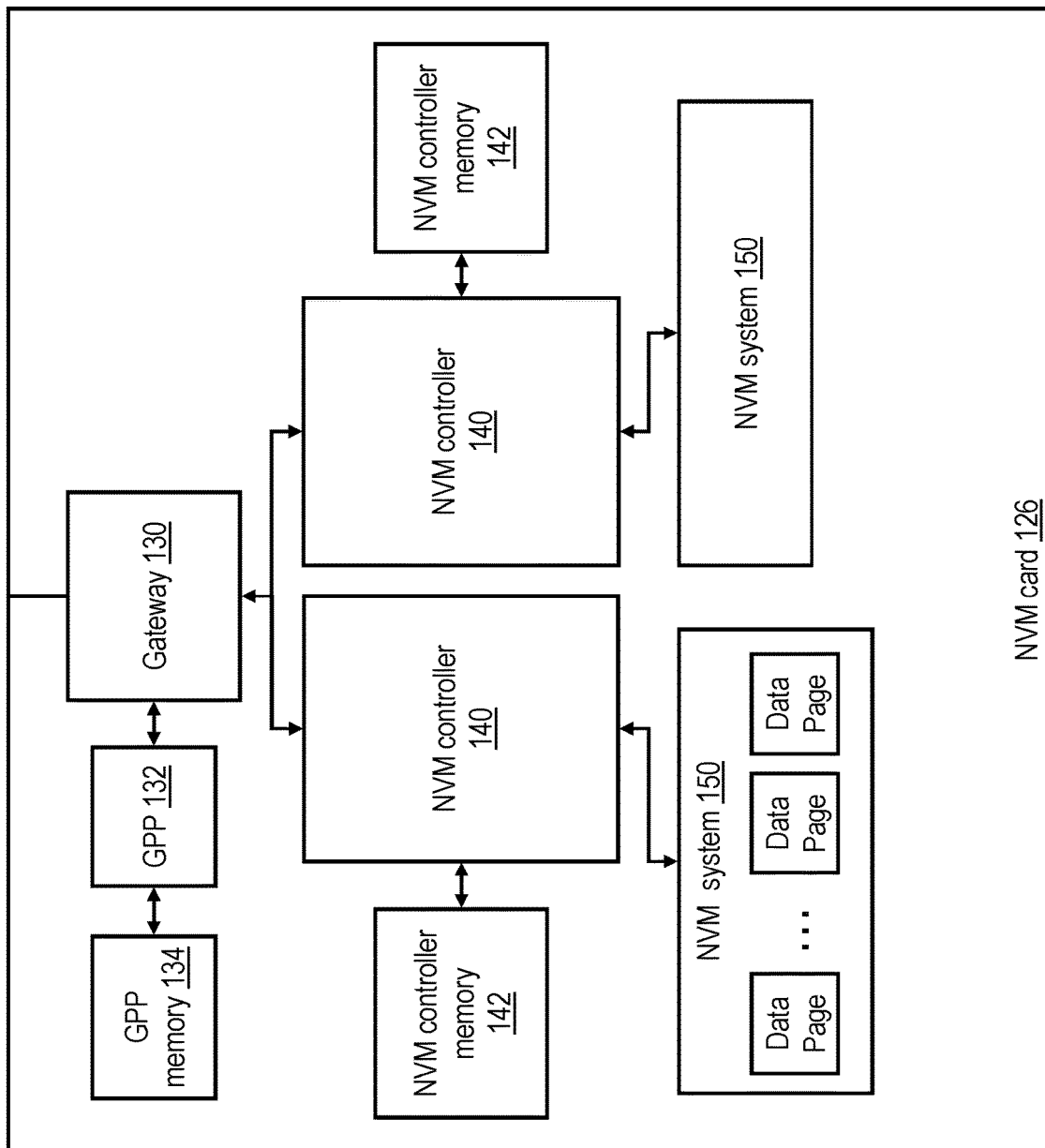
FIG. 1C is a more detailed block diagram of an exemplary non-volatile memory (NVM) card of the data storage system of FIG. 1A.

FIG. 1C depicts a more detailed block diagram of an NVM card 126 of data storage system 120 of FIG. 1A. NVM card 126 includes a gateway 130 that serves as an interface between NVM card 126 and outer RAID controllers 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by NVM card 126. GPP 132 is coupled to a GPP memory 134 (e.g., Dynamic Random Access Memory (DRAM) or Magneto-resistive Random Access Memory (MRAM)) that can conveniently buffer data created, referenced and/or modified by GPP 132 in the course of its processing.

Gateway 130 is further coupled to multiple NVM controllers 140, each of which controls a respective NVM system 150. The NVM controllers 140 may implement combined ECC/RAID data protection techniques for a NVM array. NVM controllers 140 can be implemented, for example, by an Application Specific Integrated Circuit (ASIC) or a Field Programmable Gate Array (FPGA) having an associated NVM controller memory 142 (e.g., DRAM). In embodiments in which NVM controllers 140 are implemented with an FPGA, GPP 132 may program and configure NVM controllers 140 during start-up of data storage system 120. After startup, in general operation NVM controllers 140 receive read and write IOPs from gateway 130 that request to read data stored in NVM system 150 and/or to store data in NVM system 150. NVM controllers 140 service these IOPs, for example, by accessing NVM systems 150 to read or write the requested data from or into NVM systems 150 or by accessing one or more read and/or write caches (not illustrated in FIG. 1C) associated with NVM systems 150.

NVM controllers 140 implement a translation layer that provides logical-to-physical address translation to enable access to specific memory locations within NVM systems 150. In general, an IOP received by NVM controller 140 from a host device, such as a processor system 102, contains the logical block address (LBA) at which the data is to be accessed (read or written) and, if a write IOP, the write data to be written to data storage system 120. The IOP may also specify the amount (or size) of the data to be accessed. Other information may also be communicated depending on the protocol and features supported by data storage system 120. The LBA provided by the host device corresponds to a logical page within a logical address space, the logical page typically having a size in the range between 512 bytes to four (4) kilobytes. The translation layer translates this LBA into a physical address assigned to a corresponding physical location in a NVM system 150.

NVM controllers 140 may perform address translation and/or store mappings between logical and physical addresses in a logical-to-physical translation data structure, such as a logical-to-physical translation (LPT) table, which may conveniently be stored in NVM controller memory 142.

An LPT table may also be configured to store compressed page sizes of data pages stored in NVM system 150 and even further their CRC values.

Having described the general physical structure and operation of one exemplary embodiment of a data storage system 120, certain operational aspects of data storage system 120 are now described with reference to FIG. 2, which is a high level flow diagram of the flash management functions and data structures employed by GPP 132 and/or NVM controllers 140 in accordance with one embodiment.

As noted above, data storage system 120 does not generally allow external devices to directly address and/or access the physical memory locations within NVM systems 150. Instead, data storage system 120 is generally configured to present a single contiguous logical address space to the external devices, thus allowing host devices to read and write data to and from LBAs within the logical address space while permitting NVM controllers 140 and GPP 132 to control where the data that is associated with the various LBAs actually resides in the physical memory locations comprising NVM systems 150. In this manner, performance and longevity of NVM systems 150 can be intelligently managed and optimized. In the illustrated embodiment, each NVM controller 140 manages the logical-to-physical translation using a logical-to-physical translation data structure, such as logical-to-physical translation (LPT) table 200, which can be stored in the associated flash controller memory 142. An LPT table, such as LPT table 200, can also be configured to store compressed page sizes of data pages stored in NVM systems 150 to aid in data deduplication.

Flash management code running on the GPP 132 tracks erased blocks of NVM system 150 that are ready to be used in ready-to-use (RTU) queues 206, which may be stored, for example, in GPP memory 134. In the depicted embodiment, management code running on the GPP 132 preferably maintains one or more RTU queues 206 per channel, and an identifier of each erased block that is to be reused is enqueued in one of RTU queues 206 corresponding to its channel. For example, in one embodiment, RTU queues 206 include, for each channel, a respective RTU queue 206 for each of a plurality of block health grades. In various implementations, between 2 and 8 RTU queues 206 per lane (and a corresponding number of block health grades) have been found to be sufficient.

A build block stripes function 220 performed by flash management code running on GPP 132 constructs new block stripes for storing data and associated parity information from the erased blocks enqueued in RTU queues 206. Block stripes are preferably formed of blocks of the same or similar health (i.e., expected remaining useful life) residing in different channels, meaning that build block stripes function 220 can conveniently construct a block stripe by drawing each block of the new block stripe from corresponding RTU queues 206 of different channels. The new block stripe is then queued to NVM controller 140 for data placement.

In response to a write IOP received from a host, such as a processor system 102, a data placement function 210 of NVM controller 140 determines by reference to LPT table 200 whether the target LBA(s) indicated in the write request is/are currently mapped to physical memory page(s) in NVM system 150 and, if so, changes the status of each data page currently associated with a target LBA to indicate that it is no longer valid. In addition, data placement function 210 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 220. In one embodiment, the page stripe allocation can be based on the health of the blocks available for allocation and the "heat" (i.e., estimated or measured write access frequency) of the LBA of the write data. Data placement function 210 then writes the write data, associated metadata (e.g., CRC and ECC values), for each codeword in each page of the page stripe, and parity information for the page stripe in the allocated page stripe. The associated metadata and parity information can be written to storage as soon as enough host data has been placed into the page stripe. NVM controller 140 also updates LPT table 200 to associate the physical page(s) utilized to store the write data with the LBA(s) indicated by the host device. Thereafter, NVM controller 140 can access the data to service host read IOPs by reference to LPT table 200 as further illustrated in FIG. 2.

Once all pages in a block stripe have been written, NVM controller 140 places the block stripe into one of occupied block queues 202, which flash management code running on GPP 132 utilizes to facilitate garbage collection. As noted above, through the write process, pages are invalidated, and therefore portions of NVM 150 become unused. An associated NVM controller 140 (and/or GPP 132) eventually needs to reclaim this space through garbage collection performed by a garbage collector 212. Garbage collector 212 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 204, which can conveniently be implemented in the associated flash controller memory 142 or GPP memory 134.

The NVM management functions performed by GPP 132 or NVM controller 140 additionally include a relocation function 214 that relocates the still valid data held in block stripes enqueued in relocation queue 204. To relocate such data, relocation function 214 issues relocation write requests to data placement function 210 to request that the data of the old block stripe be written to a new block stripe in NVM system 150. In addition, relocation function 214 updates LPT table 200 to remove the current association between the logical and physical addresses of the data and to replace it with the new association. Once all still valid data has been moved from the old block stripe, the old block stripe is passed to dissolve block stripes function 216, which decomposes the old block stripe into its constituent blocks, thus disassociating the blocks. NVM controller 140 then erases each of the blocks formerly forming the dissolved block stripe and increments an associated program/erase (PE) cycle count for the block in PE cycle counts 244. Based on the health metrics of each erased block, each erased block is either retired (i.e., no longer used to store user data) by a block retirement function 218 among the flash management functions executed on GPP 132, or alternatively, prepared for reuse by placing the block's identifier on an appropriate ready-to-use (RTU) queue 206 in associated GPP memory 134.

Figure 2:
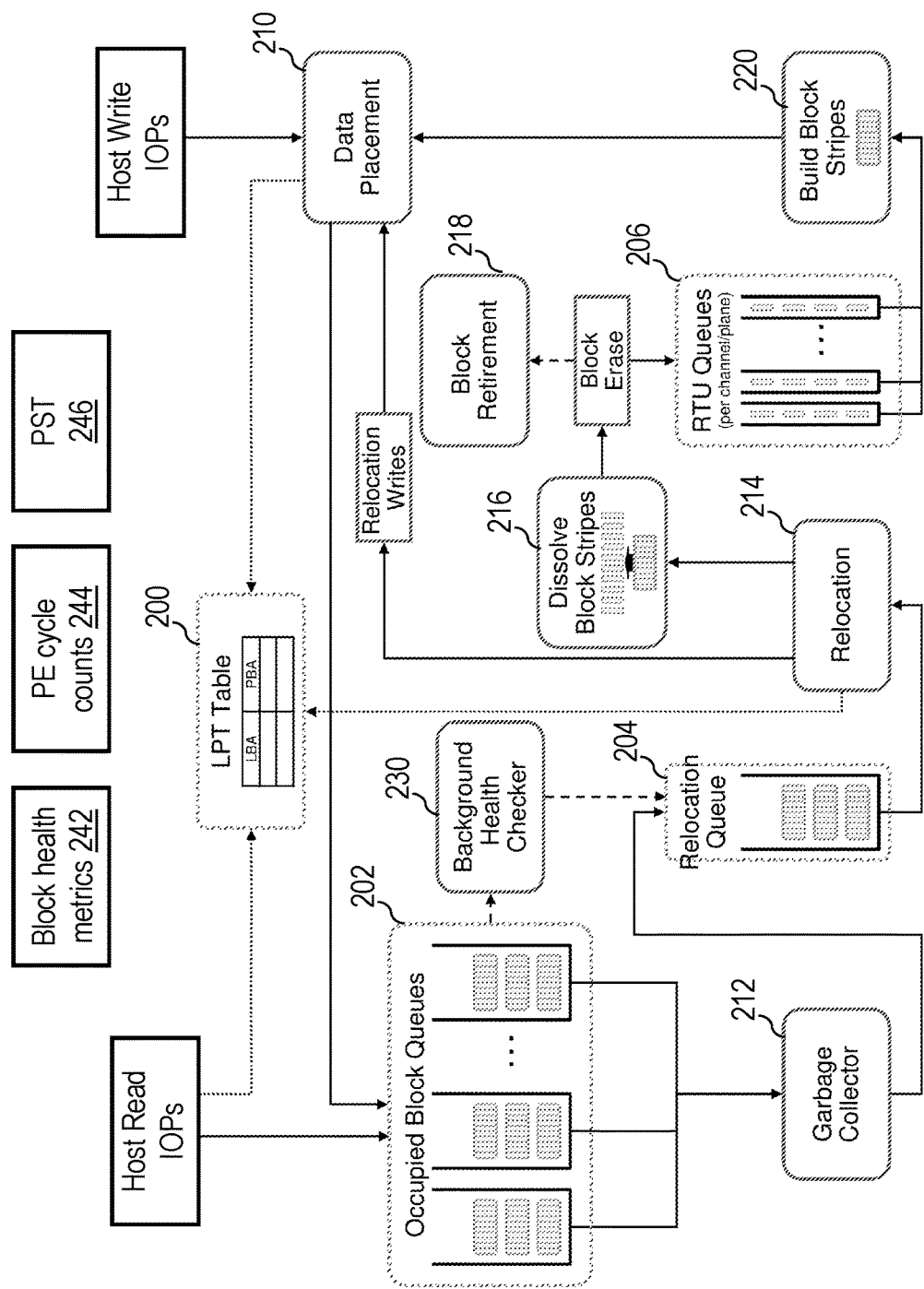
FIG. 2 is a high level flow diagram of the flash management functions and data structures employed by an NVM controller in accordance with one embodiment.

As further shown in FIG. 2, NVM management functions executed on GPP 132 include a Background Health Checker (BGHC) 230. BGHC 230, which operates independently of the demand read and write IOPs of hosts such as processor systems 102, continuously determines one or more block health metrics 242 for blocks belonging to block stripes recorded in occupied block queues 202. Based on the one or more of block health metrics 242, BGHC 230 may place block stripes on relocation queue 204 for handling by relocation function 214.

Figure 3:
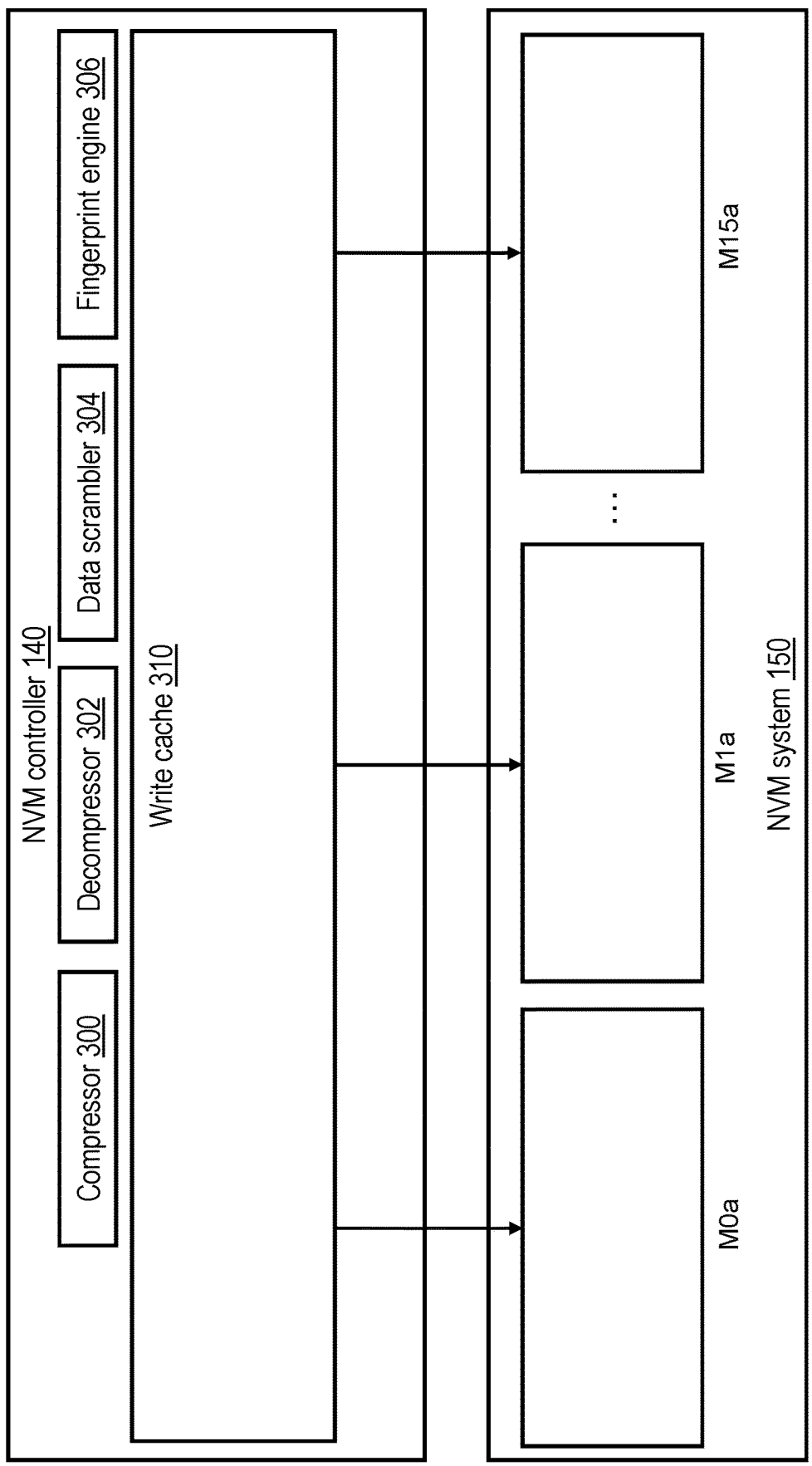
FIG. 3 depicts a more detailed view of an exemplary NVM controller and an exemplary NVM system of FIG. 1C.

NVM systems 150 may take many forms in various embodiments. Referring now to FIG. 3, there is depicted one exemplary arrangement of physical memory within a NVM system 150 in accordance with one exemplary embodiment.

NVM system 150 may be formed from thirty-two (32) individually addressable NVM storage devices, which will be referred to as packages. In the illustrated example, each of the NVM storage devices M0a-M15b takes the form of a board-mounted NVM module capable of storing one, two or more bits per cell. Thus, NVM modules may be implemented with Single Level Cell (SLC), Multi-Level Cell (MLC), Three Level Cell (TLC), Quad Level Cell (QLC) memory, or another type of NVM. The thirty-two NVM modules are arranged in sixteen groups of two, (M0a, M0b) through (M15a, M15b). For purposes of the physical addressing scheme, each group of two modules forms a "lane," also sometimes referred to as a "channel," such that NVM system 150 includes sixteen channels or lanes (Lane0-Lane15).

In one embodiment, each of the individual lanes has a respective associated bus coupling it to the associated NVM controller 140. Thus, by directing its communications to one of the specific communication buses, NVM controller 140 can direct its communications to one of the lanes of memory modules. Because each communication bus for a given lane is independent of the communication buses for the other lanes, a NVM controller 140 can issue commands and send or receive data across the various communication buses at the same time, enabling the NVM controller 140 to access the NVM modules corresponding to the individual lanes at, or very nearly at, the same time.

In the illustrated embodiment, NVM controller 140 includes a compressor 300 that selectively applies one or more data compression algorithms to data written to the associated NVM system 150, a decompressor 302 that decompresses compressed data read from NVM system 150, and a data scrambler 304. NVM controller 140 utilizes data scrambler 304 to apply a predetermined data scrambling (i.e., randomization) pattern to data written to NVM system 150 in order to improve endurance.

As further illustrated in FIG. 3, NVM controller 140 includes a write cache 310. Write cache 310 includes storage for one or more cache lines for buffering write data in anticipation of writing the data to NVM system 150.

Figure 4:
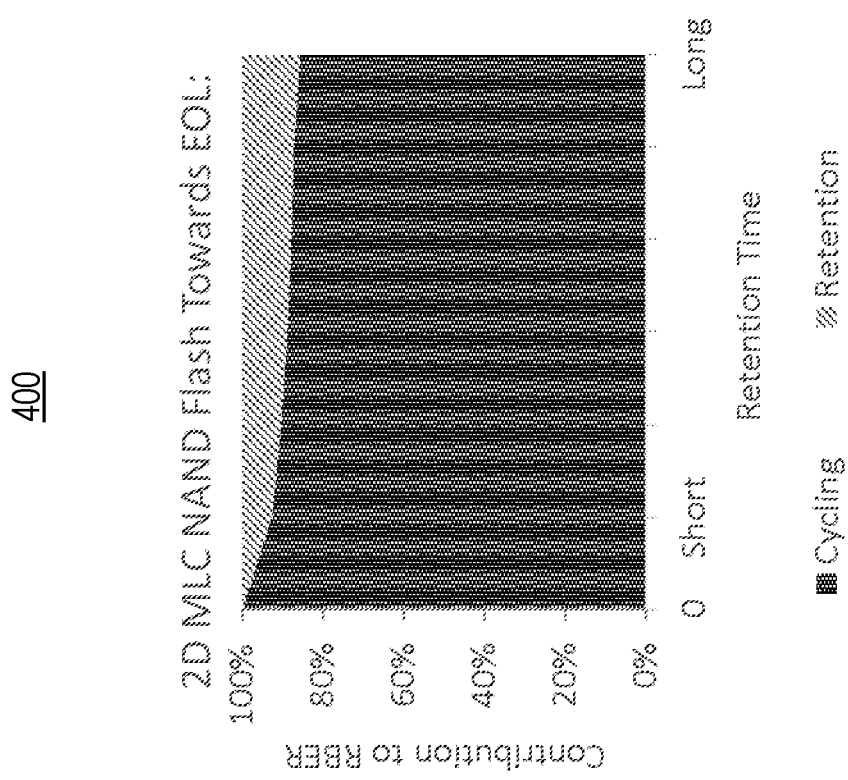
FIG. 4 is a diagram from a characterization experiment that plots the relative contributions from program/erase (P/E) cycling and data retention to the raw bit error rate (RBER) for an exemplary 2-dimensional (2D) Multi-Level Cell (MLC) NAND Flash device towards end of life.
Figure 5:
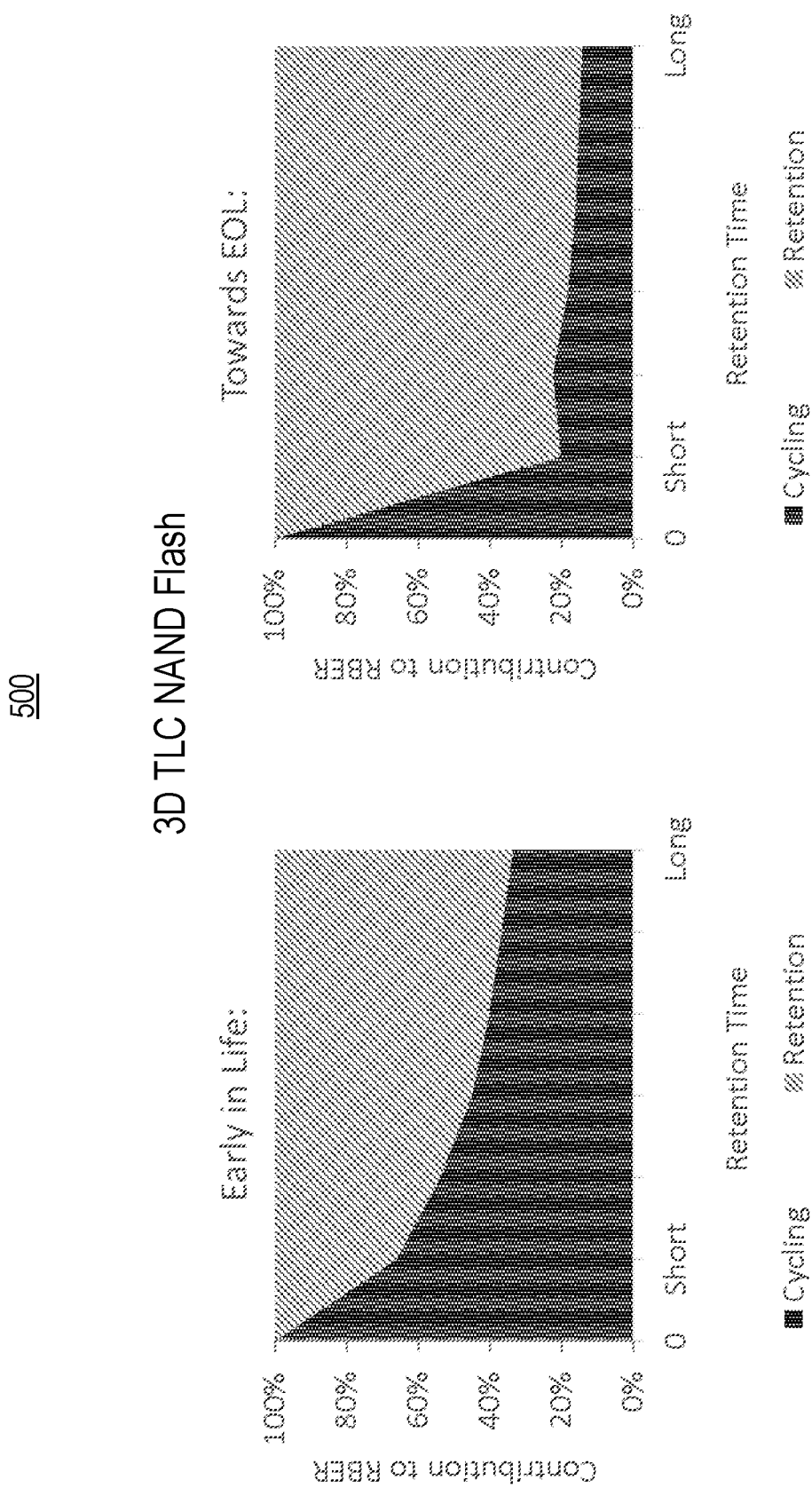
FIG. 5 is a diagram from a characterization experiment that plots the relative contributions from P/E cycling and data retention to the RBER for an exemplary 3-dimensional (3D) Three Level Cell (TLC) NAND Flash device early in life and towards end of life.

With reference to FIG. 4, an exemplary diagram 400 illustrates the relative contributions from program/erase cycling and data retention to the RBER towards end of life (EOL) for an exemplary 2D Multi-Level Cell (MLC) NAND Flash device. While the relative increase in the RBER during data retention is visible, since the increase in RBER is not pronounced it has conventionally been neglected during health binning. With reference to FIG. 5, an exemplary diagram 500 illustrates the relative contributions from program/erase cycling and data retention to the RBER early in life and towards end of life for an exemplary 3D Three Level Cell (TLC) NAND Flash device. In contrast to diagram 400 in FIG. 4, diagram 500 in FIG. 5 shows that the relative contribution to the RBER from data retention is significantly higher and dominate the RBER after a certain amount of retention. Depending on the device type and block wear, an RBER increase of more than one order of magnitude during data retention has been observed in characterization experiments. Similarly, temporary increases in the RBER are also observable from read disturbs. In general, conventional health binning treats blocks with high retention and/or a high read count incorrectly as 'less healthy' blocks, even when the blocks are actually significantly healthier when erased and written with new data. It should be appreciated that block misclassification reduces the efficiency of health binning and overall device endurance, especially for 3D TLC NAND Flash devices.

According to various aspects of the present disclosure, error metrics utilized in health binning are generally derived from block calibration or read scrubbing of blocks with low retention time and low read counts. For example, when a block has a high retention and/or a high number of reads, a current error metric for the block that is observed during read scrubbing is not used for health binning. In general, any transient effects on the RBER (e.g., from retention, read disturbs or other) may result in the current error metric for the block that is observed during read scrubbing not being used for health binning upon the detection of the contribution to the RBER being a transient one. According to the present disclosure when transient effects that change the RBER are observed, health binning utilizes previously observed error metrics (e.g., error metrics for the same block when retention time was low and when read count was low) or error metrics estimated by other techniques. In particular, health binning utilizes previously observed error metrics or error metrics estimated by other techniques when a block has a high retention and/or a high number of reads.

According to various aspects of the present disclosure, an error metric of a block may not be updated in certain cases, or the error metric of the block may be updated with an estimated value instead of a currently measured value. In various embodiments, persistent error metrics used for health binning are distinguished from transient error metrics observed during read scrubbing or block calibration (that may be used for other NVM management functions in firmware). In general, as long as the PEC count for a block has not significantly increased since a previous error metric was determined, applying a previous error metric during health binning provides a reasonably good lower bound approximation of the error metric. For example, when the maximum RBER of the worst codeword is used as error metric, an actual current maxRBER excluding transient contributions to the RBER may only be slightly higher as compared to a measured persistent value (i.e., a previous maxRBER also excluding transient contributions to the RBER) that is used for health binning, and therefore any difference can be ignored. In this case, the measured persistent value may be used as error metric for health binning when retention and/or read count for a block are high. In the event that the PEC count of a block has increased significantly since the persistent error metric for health binning was determined, an error metric that is estimated using an error metric model (with parameters that describe the block) may be used for health binning, as contrasted with using a currently measured error metric for health binning. Estimated error metrics may (or may not) be used to update error metrics in block parameter information.

Since a block must be retired when any codeword 'c' reaches the correction capability of the ECC (irrespective of which physical page 'p' the codeword 'c' is located within the block), a wear error metric '$W_b$' of a block 'b' can be defined, for example, as the number of errors found in the worst codeword of the worst page in the block as follows:

$$\text{maxRBER}_b = \frac{W_b}{C},$$

where 'C' is the codeword size.

It should be noted that other values, as described above, may be employed as the error metric. It should be appreciated that aspects of the present disclosure may be implemented in various ways. As one example, a first embodiment may be implemented that assumes there is no difference between a persistent error metric and a transient (i.e., current or real) error metric. As another example, a second embodiment may be implemented that uses an accurate model of a persistent error metric increase and models the behavior of each block independently. As still another example, a third embodiment may assume a linear or low-order polynomial increase in the persistent error metric as an approximation of the model used in the second embodiment. As yet another example, a fourth embodiment may be based on the model from the first embodiment using model parameters that are the average of all blocks.

In the first embodiment, health binning only uses a single error metric value (i.e., error count). In the first embodiment, the PEC count '$E_b$' of block 'b' in which the error metric was measured is not used. In the first embodiment, there is one data point per block, i.e., a tuple holding the latest persistent tuple of [$W_b$, $E_b$]. During background scrubbing, the BGHC produces a new tuple of [$W_b^{new}$, $E_b^{new}$]. Then, if the scrubbed block had low retention time and a low read count since the last scrubbing, the new tuple [$W_b^{new}$, $E_b^{new}$] replaces the previous tuple [$W_b$, $E_b$]. If, however, the scrubbed block had high retention time or a high read count, the tuple [$W_b^{new}$, $E_b^{new}$] does not replace the previous persistent tuple [$W_b$, $E_b$]. In case the $E_b$ and $E_b^{new}$ do not differ significantly, which can be achieved by frequent background scrubs (e.g., typically within a few days or less), and the previously measured persistent error metric $W_b$ (which is a reasonably good approximation of the error metric) can be used by health binning as an estimate of block health. For example, when the maximum RBER of the worst codeword is used as error metric, the current or real maxRBER may only be slightly higher as compared to the measured persistent value that is used for health binning and, as such, the difference can be ignored. The approximation may then be used as the error metric for health binning when retention and/or read count are high.

In the second embodiment, when the currently measured error count cannot be used as an error metric (e.g., due to high contributions from retention and/or read disturbs), one can use the previously measured persistent $W_b^{prev}$ (measured the last time BGHC saw a low retention and a low read-disturb count) and extrapolate the new $W_b^{curr}$ taking into account the current and previous PEC count (i.e., $E_b^{curr}$ and $E_b^{prev}$ respectively). It should be appreciated that the approach requires modeling the behavior of $W_b$ for each block (the modeling is described in additional detail below). Modeling the increase in the persistent error metric as per the second embodiment may be desirable if background scrubbing cannot be performed frequently enough, since in this case a block can experience a significant number of PEC counts between persistent error metric measurements or if the background scrubbing was not able to measure the persistent error metric due to a recurring presence of transient effects. In general, the second embodiment requires at least two persistent data points per block and support for moderately complex analytical calculations at runtime.

Wear of a 2D flash block of advanced age can typically be accurately modeled as a function of the PEC count using the following log-log model:

$$\log_{10}(W_b) = x_b + y_b \cdot \log_{10}(E_b).$$

where '$E_b$' denotes the PEC count of block 'b', and $x_b$ and $y_b$ are parameters/coefficients distinct for each block. For 3D flash, the following log-linear model may be more accurate:

$$\log_{10}(W_b) = x_b + y_b \cdot E_b.$$

Figure 6:
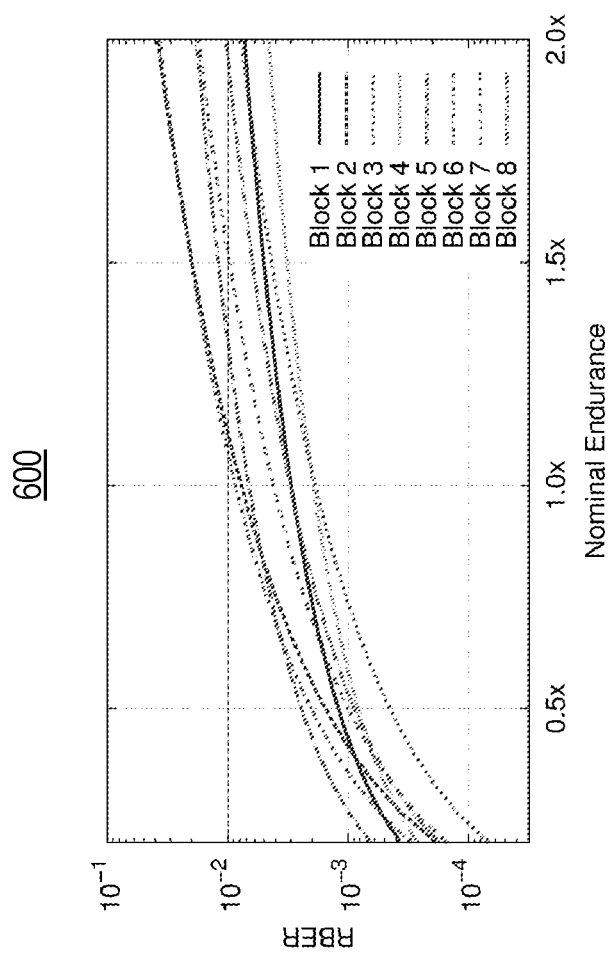
FIG. 6 is a simulation diagram of a log-log model that characterizes an exemplary maximum RBER of a worst codeword in a block (maxRBER) during P/E cycling for eight (8) blocks of an exemplary NAND Flash device.

Diagram 600 of FIG. 6 illustrates the maxRBER for eight (8) blocks generated from the log-log model obtained from a large enough characterization data set of a particular flash device type to which the expectation maximization algorithm had been applied to create a 2D Gaussian mixture model to generate the block wear parameters $x_b$ and $y_b$. The x-axis denotes the nominal endurance as specified by the manufacturer. Some blocks initially less healthy seem to have a very high endurance while other blocks that are initially more healthy age quickly. Overall, these are expected conditions for which health binning can significantly enhance endurance in presence of skew in the write workload. A history of two or more persistent [$W_b$, $E_b$] pairs can be used to determine the values of $x_b$ and $y_b$ using the least square fitting method. As the model coefficients are unique for each block, this approach results in an accurate estimation of the error metric. Alternatively, the parameters $x_b$ and $y_b$ can be stored. In this case, only a single [$W_b$, $E_b$] pair from a previous measurement may be required.

Figure 7:
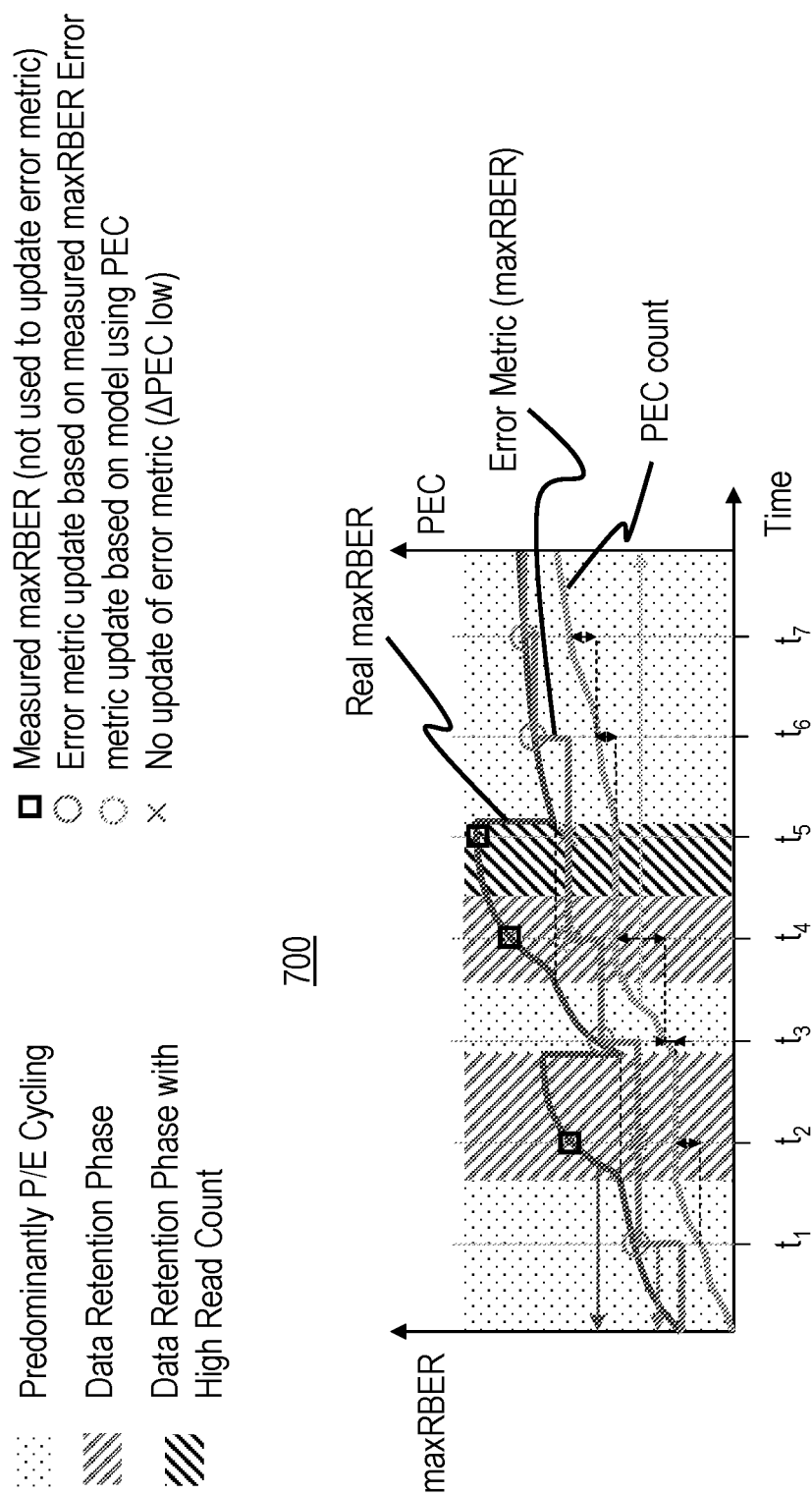
FIG. 7 depicts an exemplary diagram that illustrates error metric determination for one block of an exemplary 3D TLC NAND Flash device in accordance with one embodiment of the present disclosure.

With reference to FIG. 7, a diagram 700 shows an exemplary evolution of the error metric in terms of the maxRBER and the PEC count of a block. At points $t_1$-$t_7$ the block is handled by the BGCH for read scrubbing or block calibration. At these points in time the actual maxRBER of the block is determined. Depending on the calibration/read scrubbing algorithm and ECC decoder used, the actual maxRBER measured may closely follow the current or real maxRBER. At points $t_1$, $t_3$, $t_6$, and $t_7$ error metrics are updated based on the measured maxRBER. At points $t_2$ and $t_5$ the error metric is not updated, as the PEC delta between the current and previous BGHC scans is low (e.g., below a threshold). At point $t_4$, however, the PEC delta between the current and previous BGHC scans is high (e.g., greater than a few hundreds or thousands) and the error metric is updated based on the model discussed above.

Figure 8:
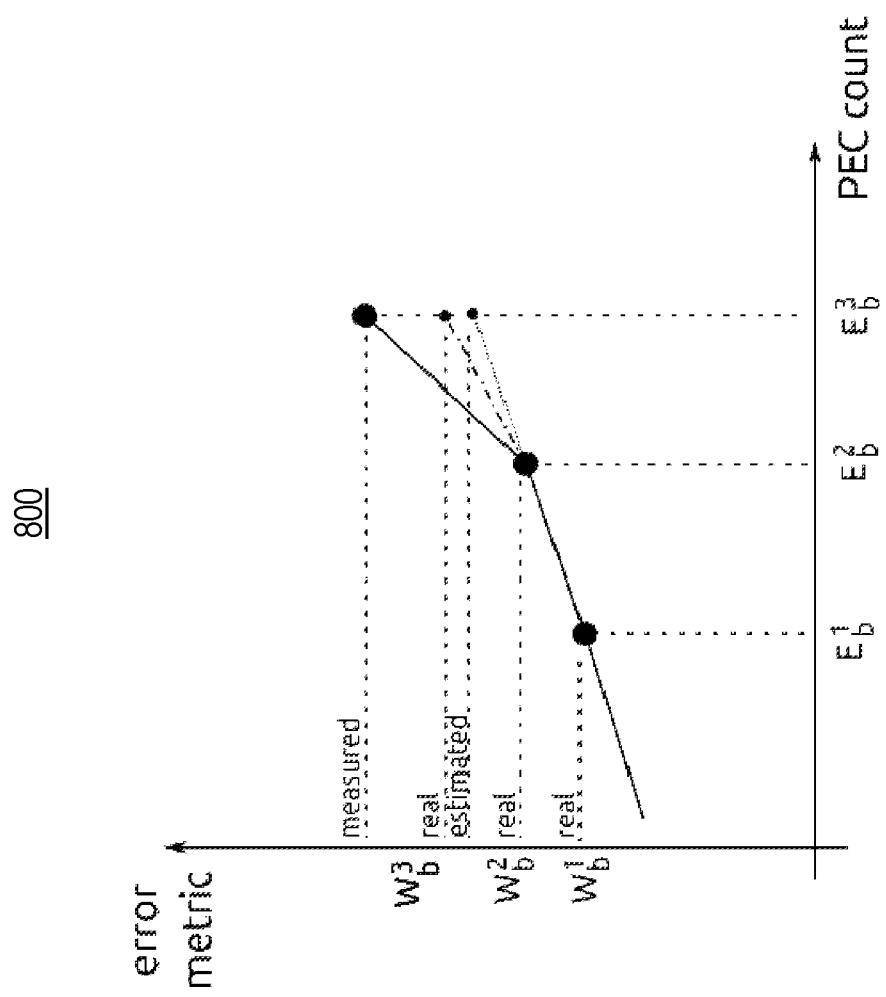
FIG. 8 depicts an exemplary diagram that plots an error metric versus P/E cycle (PEC) count for one block of an exemplary 3D TLC NAND Flash device.

The third embodiment is based on the second embodiment with additional simplifications to reduce the computational overhead. It may be desirable to have at least two additional data points per block, which may be used to produce a linear approximation of changes in the error metric. With reference to diagram 800 of FIG. 8, a linear approximation of the persistent error metric increase $W_b^{3,estimated}$ at $E_b^3$ is illustrated. Although only the high value $W_b^{3,measured}$ is available, it is possible to estimate the real $W_b^{3,real}$ based on the previous error metrics $W_b^1$ and $W_b^2$. As is shown, at $E_b^3$ the real error metric due to permanent changes in the underlying threshold voltage distributions only is not available and the measured error metric cannot be used due to temporary effects. Based on [$W_b^1$, $E_b^1$] and [$W_b^2$, $E_b^2$], an estimated error metric [$W_b^{3,estimated}$, $E_b^3$] may be generated by linear extrapolation and used for health binning. If the difference between $E_b^2$ and $E_b^3$ is large (e.g., greater than a few hundreds or thousands), the real error metric is expected to be slightly higher than the estimated error metric, as the error metric typically increases super-linearly. It may be beneficial to replace the linear approximation of the error metric change with a low-order polynomial that approximates the appropriate model introduced above and thereby takes into account the super-linear increase in the error metric. Similarly, using the logarithm of the error metric may be used as well.

Based on the characterization results, a low-order polynomial such as the following may be used:

$$W_b^{curr,estimated}=A+B*(E_b^{curr}-E_b^{prev})+C*(E_b^{curr}-E_b^{prev})^2+D*(E_b^{curr}-E_b^{prev})^a+\ldots$$

For example, $W_b^{3,estimated}$ may be calculated by:

$$W_b^{3,estimated}=A+B*(E_b^a-E_b^2)+C*(E_b^a-E_b^2)^2+D*(E_b^a-E_b^2)^3+\ldots$$

where the order of the polynomial can be determined based on the desired precision, computational limitations of the general-purpose processor, or some other factors. The coefficients are obtained by from the model and appropriate model parameters $x_b$ and $y_b$ that the polynomial approximates (e.g., using Taylor series). In most cases, a second order polynomial is sufficient. For example, the second order polynomial may be given by:

$$W_b^{curr,estimated}=A+B*(E_b^{curr}-E_b^{prev})+C*(E_b^{curr}-E_b^{prev})^2$$

A fourth embodiment extrapolates the new $W_b^{curr}$ based on the current and previous PEC count $E_b^{curr}$ and $E_b^{prev}$ and uses the average Least Square (LS) model coefficients $\hat{x}_b$ and $\hat{y}_b$. If the difference between $E_b^{curr}$ and $E_b^{prev}$ is small, $W_b^{prev}$ can even be used without additional adjustment (similar to what is done in the first embodiment). As the starting data point $\lfloor W_b^{prev}, E_b^{prev} \rfloor$ is typically not on the curve with the average LS model coefficients, a vertical offset $\delta_b$ may be added as follows:

$$\delta_b=\log_{10}(W_b^{prev})-x_b-y_b \cdot E_b^{prev}$$

$$\log_{10}(W_b^{curr})=x_b+y_b \cdot E_b^{curr}+\delta_b$$

It should be noted that this option does not treat the blocks differently and only one tuple of $[W_b, E_b]$ per block is required to be maintained. It should be appreciated that the optimizations described in the third embodiment can also be applied to the fourth embodiment. It is also possible to use averaging other than Ordinary Least Square, e.g., Least Square Root, or Least Absolute Difference. Further, characterization data of blocks with similar characteristics can be grouped together and the average model coefficients $\hat{x}_b$ and $\hat{y}_b$ can be determined for each of these groups. The best matching coefficients can then be applied to determine the estimated error metric $\lfloor W_b^{3,estimated}, E_b^3 \rfloor$. It should be noted that this option treats the blocks differently while only an identifier of the group with the best matching coefficients and one tuple of $[W_b, E_b]$ is required to be maintained per block. Depending on device characteristics, two or more groups may be sufficient to treat blocks differently.

A block having either high retention or a high read count but no previously retained error metric is a boundary condition. This typically only happens at the beginning of device life when a block has not seen a lot of program/erase cycles and, as such, temporary changes in the error metrics are small and can be neglected. In this case, the current error metric(s) can be used as the first value to be stored. It should be noted that all stored values $W_b^i$, $E_b^i$, $x_b$, and $y_b$ may be further reduced in storage size by sampling. Estimated error metrics $W_b$ may be used to create a new persistent tuple of $[W_b, E_b]$ that is stored. One may define minimal and/or maximal distances between $E_b^i$ values that are taken into account when determining the model parameters for the block.

The disclosed techniques are also applicable to the case where partial blocks are being retired (i.e., page-level retirement). In this case the error metric denotes the wear of the partial block which may be a single page, a partial page, or a group of pages in the same block. As an extension a per-block flag called "needs base calibration" may be introduced. The flag is set when the error metric should be updated due to a significant increase in PEC count since the last base calibration but currently cannot be updated because of high read count, high retention, and unavailability of an accurate model as described in the first embodiment. As one example, the flag may be checked when the block stripe is going to be placed in the occupied block pool (i.e., data placement completely filled up the stripe with new data). If the flag of any block in the stripe is set at this point, the block can be queued for an immediate calibration (on-demand block calibration).

Figure 9:
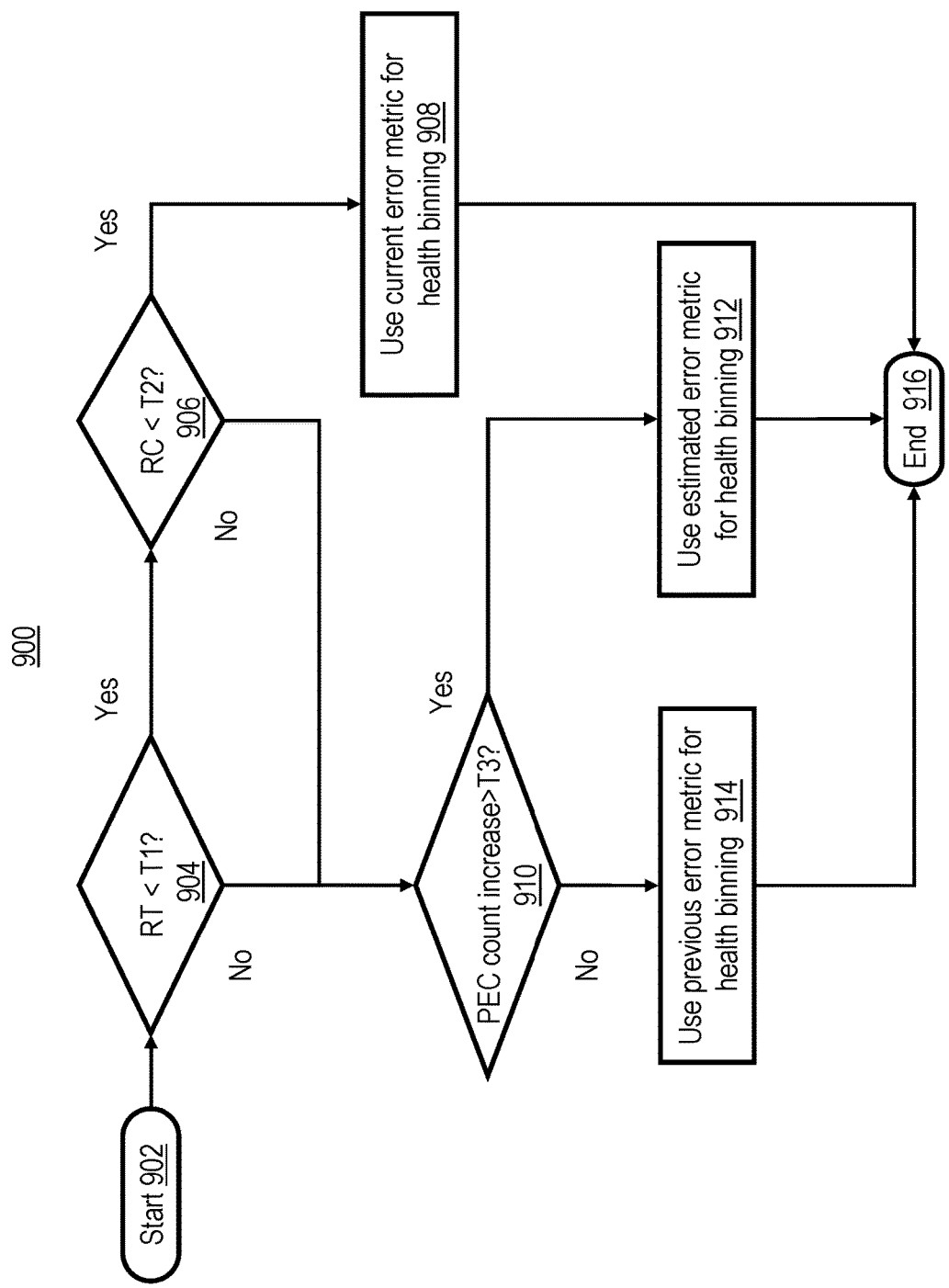
FIG. 9 is a high level logical flowchart of an exemplary retention and read-disturb aware health binning process for a NVM in accordance with one embodiment of the present disclosure.

With reference to FIG. 9, an exemplary process 900 is illustrated that facilitates retention and read-disturb aware health binning, according to the present disclosure. Process 900 is initiated in block 902 by, for example, an NVM controller 140, in response to BGHC 230 performing a read scrub or block calibration operation. Next, in decision block 904, NVM controller 140 determines whether a data retention time (RT) for a block is less than a first threshold (T1), e.g., depending on the device in the order of minutes, hours, days, or weeks. In response to the data retention time for the block being less than the first threshold control transfers from block 904 to decision block 906. In block 906, NVM controller 140 determines whether a read count (RC) for the block is less than a second threshold (T2), e.g., in the order of several hundreds, thousands, ten-thousands of reads since the block was programmed depending on the characteristics of the device. In response to the read count for the block being less than the second threshold control transfers from block 906 to block 908. In block 908, NVM controller 140 utilizes a current error metric (e.g., a real maxRBER) for health binning. From block 908 control transfers to block 916 where process 900 terminates.

In response to the data retention time for the block not being less than the first threshold in block 904 control transfers to decision block 910. Also, in response to the read count for the block not being less than the second threshold in block 906 control transfers to block 910. In block 910, NVM controller 140 determines whether a PEC count increase for the block is greater than a third threshold (T3), e.g., a few hundreds or thousands. In response to the PEC count increase for the block not being greater than the third threshold in block 910 control transfers to block 914. In block 914 NVM controller 140 utilizes a previous error metric for health binning. From block 914 control transfers to block 916. In response to the PEC count increase for the block being greater than the third threshold in block 910 control transfers to block 912. In block 912 NVM controller 140 utilizes an estimated error metric (e.g., estimated based on an error metric model) for health binning. From block 912 control transfers to block 916.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a NVM controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of an NVM such as a phase change memory (PCM), it should be appreciated that embodiments of the present invention can also be used with other types of non-volatile random access memory (NVRAM) including, for example, flash memory, as well as traditional rotational hard drives (HDDs), shingled magnetic recording hard disk drives (SMR HDDs) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of performing health binning in a storage system, the method comprising:
   during a particular program-erase cycle (PEC) of a block of the storage system, a controller of the storage system determining a specific health grade among multiple health grades for assignment to the block, the determining including:
      determining whether the block is in a first phase of the particular PEC in which a retention time of the block is below a first threshold and a read count of the block is below a second threshold;
      based on determining the block is in the first phase of the particular PEC, selecting, by the controller, a first error metric for health binning the block, wherein the first error metric is a current error metric for the block measured during the first phase of the particular PEC;
      based on determining the block is not in the first phase and is instead in a subsequent second phase of the particular PEC in which the retention time of the block is above a third threshold that is greater than or equal to the first threshold or in which the read count of the block is above a fourth threshold that is greater than or equal to the second threshold, selecting, by the controller, a second error metric for health binning the block, wherein the second error metric has a value different than that of the current error metric during the second phase and was predetermined prior to the second phase of the particular PEC;
   the controller assigning the block the specific health grade based on the selected one of the first error metric and the second error metric; and
   based on the specific health grade assigned by the controller the controller mapping a write stream with a suitable heat level upon data placement to the block.

2. The method of claim 1, wherein the second error metric is a previous error metric for the block that was measured by the controller prior to the particular PEC.

3. The method of claim 1, wherein the second error metric is an estimated error metric for the block.

4. The method of claim 3, and further comprising:
   based on a program/erase cycle count of the block increasing above a fifth threshold since a previous error metric was determined by the controller, the controller estimating the second error metric using a block error metric model.

5. The method of claim 1, wherein the first error metric includes one or more of a per-page and/or per-block raw bit error count, an average raw bit error rate (RBER) of the block, a maximum RBER of a worst codeword in the block, a rate of change of the RBER, and an average per-page RBER.

6. The method of claim 1, wherein the first error metric is measured by the controller during a most recent read scrubbing of the block.

7. The method of claim 1, wherein the first error metric is measured by the controller during a most recent block calibration of the block.

8. A data storage system, comprising:
   a non-volatile memory (NVM) array including a plurality of blocks of data storage, the plurality of blocks including a block; and
   a controller coupled to the NVM array, wherein the controller is configured to perform:
      during a particular program-erase cycle (PEC) of the block of the NVM array, the controller determining a specific health grade among multiple health grades for assignment to the block, the determining including:
         determining whether the block is in a first phase of the particular PEC in which a retention time of the block is below a first threshold and a read count of the block is below a second threshold;
         based on determining the block is in the first phase, selecting a first error metric for health binning the block, wherein the first error metric is a current error metric for the block measured during the first phase of the particular PEC;
         based on determining the block is not in the first phase and is instead in a subsequent second phase of the particular PEC in which the retention time of the block is above a third threshold that is greater than or equal to the first threshold or in which the read count of the block is above a fourth threshold that is greater than or equal to the second threshold, selecting a second error metric for health binning the block, wherein the second error metric has a value different than that of the current error metric during the second phase and was predetermined prior to the second phase of the particular PEC;
      assigning the block the specific health grade based on the selected one of the first error metric and the second error metric; and based on the specific health grade assigned by the controller, mapping a write stream with a suitable heat level upon data placement to the block.

9. The data storage system of claim 8, wherein the second error metric is a previous error metric for the block that was measured by the controller prior to the particular PEC.

10. The data storage system of claim 8, wherein the second error metric is an estimated error metric for the block.

11. The data storage system of claim 10, wherein the controller is configured to, wherein based on a program/erase cycle count of the block increasing above a fifth threshold since a previous error metric was determined by the controller, to estimate the second error metric using a block error metric model.

12. The data storage system of claim 8, wherein the first error metric includes one or more of a per-page and/or per-block raw bit error count, an average raw bit error rate (RBER) of the block, a maximum RBER of a worst codeword in the block, a rate of change of the RBER, and an average per-page RBER.

13. The data storage system of claim 8, wherein the first error metric is measured by the controller during a most recent read scrubbing of the block.

14. The data storage system of claim 8, wherein the first error metric is measured by the controller during a most recent block calibration of the block.

15. A computer program product, the computer program product comprising a computer readable storage medium having program instructions embodied therein, the program instructions executable by a controller of a storage system, to cause the controller to perform:

during a particular program-erase cycle (PEC) of a block among the plurality of blocks in the storage system, determining a specific health grade among multiple health grades for assignment to the block, the determining including:
 determining whether the block is in a first phase of the particular PEC in which a retention time of the block is below a first threshold and a read count of the block is below a second threshold;
 based on determining the block is in the first phase, selecting a first error metric for health binning the block, wherein the first error metric is a current error metric for the block measured during the first phase of the particular PEC;
 based on determining the block is not in the first phase and is instead in a subsequent second phase of the particular PEC in which the retention time of the block is above a third threshold that is greater than or equal to the first threshold or in which the read count of the block is above a fourth threshold that is greater than or equal to the second threshold, selecting a second error metric for health binning the block, wherein the second error metric has a value different than that of the current error metric during the second phase and was predetermined prior to the second phase of the particular PEC;
assigning the block the specific health grade based on the selected one of the first error metric and the second error metric; and
based on the specific health grade assigned by the controller, mapping a write stream with a suitable heat level upon data placement to the block.

16. The computer program product of claim 15, wherein the second error metric is a previous error metric for the block that was measured by the controller prior to the particular PEC.

17. The computer program product of claim 15, wherein the second error metric is an estimated error metric for the block.

18. The computer program product of claim 17, wherein the program instructions cause the controller to perform:
 based on a program/erase cycle count of the block increasing above a fifth threshold since a previous error metric was determined by the controller, estimating the second error metric using a block error metric model.

19. The computer program product of claim 15, wherein the first error metric includes one or more of a per-page and/or per-block raw bit error count, an average raw bit error rate (RBER) of the block, a maximum RBER of a worst codeword in the block, a rate of change of the RBER, and an average per-page RBER.

20. The computer program product of claim 15, wherein the first error metric is measured by the controller during a most recent read scrubbing of the block or a most recent block calibration of the block.

\* \* \* \* \*